(12) United States Patent
Turner et al.

(10) Patent No.: US 9,026,549 B2
(45) Date of Patent: *May 5, 2015

(54) IMAGE TILE SERVER

(75) Inventors: Neil Turner, Emeryville, CA (US); Christian Fernandez, El Cerrito, CA (US); Michael Lessin, San Leandro, CA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,215

(22) Filed: Aug. 13, 2012

(65) Prior Publication Data

US 2012/0301054 A1 Nov. 29, 2012

Related U.S. Application Data

(63) Continuation of application No. 12/285,002, filed on Sep. 26, 2008, now Pat. No. 8,244,770.

(60) Provisional application No. 60/960,358, filed on Sep. 26, 2007.

(51) Int. Cl.
G06F 17/30 (2006.01)

(52) U.S. Cl.
CPC .................. *G06F 17/3028* (2013.01)

(58) Field of Classification Search
CPC .................................................. G06F 17/3087
USPC ......................................... 707/769; 709/219
See application file for complete search history.

(56) References Cited

U.S. PATENT DOCUMENTS

| 7,894,984 | B2 | 2/2011 | Rasmussen | |
|---|---|---|---|---|
| 2003/0076722 | A1* | 4/2003 | Solomon | 365/200 |
| 2003/0158916 | A1* | 8/2003 | Cronin et al. | 709/219 |
| 2004/0135784 | A1 | 7/2004 | Cohen | |
| 2004/0157641 | A1 | 8/2004 | Chithambaram | |
| 2006/0103665 | A1 | 5/2006 | Opala | |
| 2006/0170693 | A1* | 8/2006 | Bethune et al. | 345/568 |
| 2007/0080830 | A1 | 4/2007 | Sacks | |
| 2007/0226314 | A1 | 9/2007 | Eick | |
| 2008/0174593 | A1 | 7/2008 | Ham | |
| 2008/0222273 | A1* | 9/2008 | Lakshmanan et al. | 709/219 |

OTHER PUBLICATIONS

"Oracle Application Server Mapviewer User's Guide", Release 10.1.2.1, B14036-03, Nov. 2006, Murray Chuck.*
U.S. Appl. No. 11/251,766, filed Oct. 2005, Barcklay.
Google Search—cache object servlet tile map client, Feb. 9, 2011, pp. 1-2.
Google Search—tile map display to inclide a predictive caching ajax client, Jul. 26, 2011, pp. 1-3.
Google Search—image tile map servlet predicted cache, Jan. 4, 2012, pp. 1-2.
Google Search—replaced map image tile maintain server cache, Jun. 5, 2012, pp. 1-2.

* cited by examiner

*Primary Examiner* — Etienne Leroux
*Assistant Examiner* — Cindy Nguyen
(74) *Attorney, Agent, or Firm* — William H. Bollman

(57) ABSTRACT

An image tile server importantly includes an image tile cache, to support a tiled map display in a user device. Instead of the conventional user device client (e.g., an Ajax client) making image requests directly to a mapping server (MS), a display device initiates an image request of a tile server (TS), and the tile server returns the requested image. However, importantly, the tile server (TS) also retains a cached copy of the returned image for faster retrieval at a later time relating to another image request by the same or different user device.

14 Claims, 8 Drawing Sheets http://atweb.2kivera.com:8080/CachingServletTest/CachingServlet?key=3_33_11

```
<INIT-PARAM>
    <param-name>cacheRootDirectory</param-value>
    <param-value>cachingServletCachrRoot</param-value>
</init-param>
<init-param>
    <description>Any positive integer. (see cacheSizeUnit)</description>
    <param-name>cacheSize</param-name>
    <param-value>20</param-value>
</init-param>
<init-param>
    <description>KB (2^10), MB (2^20) or GB (2^30) (see cacheSize)</description>
    <param-name>cacheSizeUnit</param-name>
    <param-value>KB</param-value>
</init-param>
<init-param>
<param-nam>host</param-name>
    <param-value>atweb2.kivera-dc.com</param-value>
<init-param>
<init-param>
    <param-name>port</param-name>
    <param-value>32200</param-value>
<init-param>
<init-param>
    <param-name>maximumConnections</param-name>
<param-value>5</param-value>
    <param-name>timeOut</param-name>
    <param-value>5</param-value>
<init-param>
```

IMAGE TILE SERVER

This application is a continuation of U.S. application Ser. No. 12/285,002, entitled "Image Tile Server", filed on Sep. 26, 2008, now U.S. Pat. No. 8,244,770; which claims priority from U.S. Provisional Application No. 60/960,358, entitled "Tile Server", to Turner, filed Sep. 26, 2007, the entirety of both of which are expressly incorporated herein by reference.

BACKGROUND OF THE INVENTION

1. Field of the Invention

This invention relates generally to wireless telecommunication. More particularly, it relates to display techniques in network applications.

2. Background of Related Art

Year by year, wireless devices such as cell phones have grown smaller and lighter. Along with this trend of miniaturization is the implementation of a display screen that is correspondingly small. The size of the display screen, and amount of memory within the wireless device, are often limiting factors in many applications. This is particularly true for applications running in a wireless device that attempt to display a map for a user.

When a map is displayed in a wireless device using a conventional application, typically a map somewhat larger than the size of the display screen is downloaded and displayed centered on the display. However, existing map display applications are a bit cumbersome to use on a wireless device, as they typically do not allow the user to fluidly pan around a map that is being displayed at the time.

SUMMARY OF THE INVENTION

In accordance with the principles of the present invention, an image tile server comprises an image tile server object, and an image tile server cache object. The image tile files are passed between the image tile server object and the image tile server cache object using a GET( ) command.

In accordance with another aspect of the invention, an image tile server comprises an image tile server object, and an image tile server cache object. The image tile server object obtains image tiles from the image file database via the image tile server cache object.

A method of obtaining a tiled image from an image tile server in accordance with yet another aspect comprises receiving a request for an image tile, at a tile server remote from a requesting user device. The requested image tile is retrieved from a tile server cache maintained for multiple user access. The requested image tile from the tile server cache is provided to the requesting user device.

Another method of retrieving an image tile file from a tile server comprises receiving a request for an image tile, at a tile server remote from a requesting user device. The requested image tile is requested from a tile server cache if previously provided, or from a tile server database maintained for multiple user access if the requested image tile is not cached. The requested image tile is provided from the tile server cache to the requesting user device.

A method of retrieving an image tile file from a tile server in accordance with still another aspect comprises receiving a request for an image tile, at a tile server remote from a requesting user device. The requested image tile is retrieved from a tile server cache if previously provided, or from a tile server database maintained for multiple user access if the requested image tile is not cached. The requested image tile from the tile server cache is provided to the requesting user device.

A method of providing a tile server cache comprises receiving an image tile request from a user device, at a tile server remote from a requesting user device. The requested image tile is retrieved from an image tile database. The retrieved requested image tile is provided to the user device. A cached copy of the returned image tile file is retained for faster retrieval at a later time relating to another image request by a same or different user device.

BRIEF DESCRIPTION OF THE DRAWINGS

Features and advantages of the present invention will become apparent to those skilled in the art from the following description with reference to the drawings, in which:

FIG. 4 shows an exemplary URL to request a tile from the inventive tile server, in accordance with the principles of the present invention.

FIG. 5 shows relevant portions of an exemplary configuration file, in accordance with the principles of the present invention.

DETAILED DESCRIPTION OF ILLUSTRATIVE EMBODIMENTS

A tiled image map display has been described, e.g., in co-pending U.S. patent application Ser. No. 11/251,766, entitled "Tiled Map Display on a Wireless Device" to Barcklay et al., filed Oct. 18, 2005, the entirety of which is explicitly incorporated herein by reference.

According to that co-pending, co-owned application, a tiled-image map display provides an easy, seamless, wait-free and convenient viewing of a map or other pan-able image, e.g., by a user of a wireless device. That particular application describes improvement of a tiled-map display to include a predictive caching technique to minimize user wait time, and to allow for the illusion of continuous panning, even while map tile images are being loaded. An important component of the tiled image map display, implemented in BREW or J2ME in a wireless device, is the way that image map tiles are put together on a small screen. The disclosed embodiments in that application show a tiled image loaded in blocks, or tiles, providing a 3×3 matrix of tiles about an image currently being displayed.

The present invention provides an image tile server importantly including an image tile cache, to support a tiled map display in a user device, e.g., in a wireless device. The inventive tile server (TS) caches images from a mapping server (MS) (e.g., the Xypoint Mapping Server (XMS) available from TeleCommunication Systems, Inc. of Annapolis, Md.).

Conventionally, a user device client would make an image request directly to a mapping server (MS). Limited caching may be performed at the display device itself.

In accordance with the principles of the present invention, instead of the user device client (e.g., an Ajax client) making image requests directly to a mapping server (MS), a display device initiates an image request of a tile server (TS), and the tile server returns the requested image. However, importantly, the tile server (TS) also retains a cached copy of the returned image for faster retrieval at a later time relating to another image request.

Figure 1:
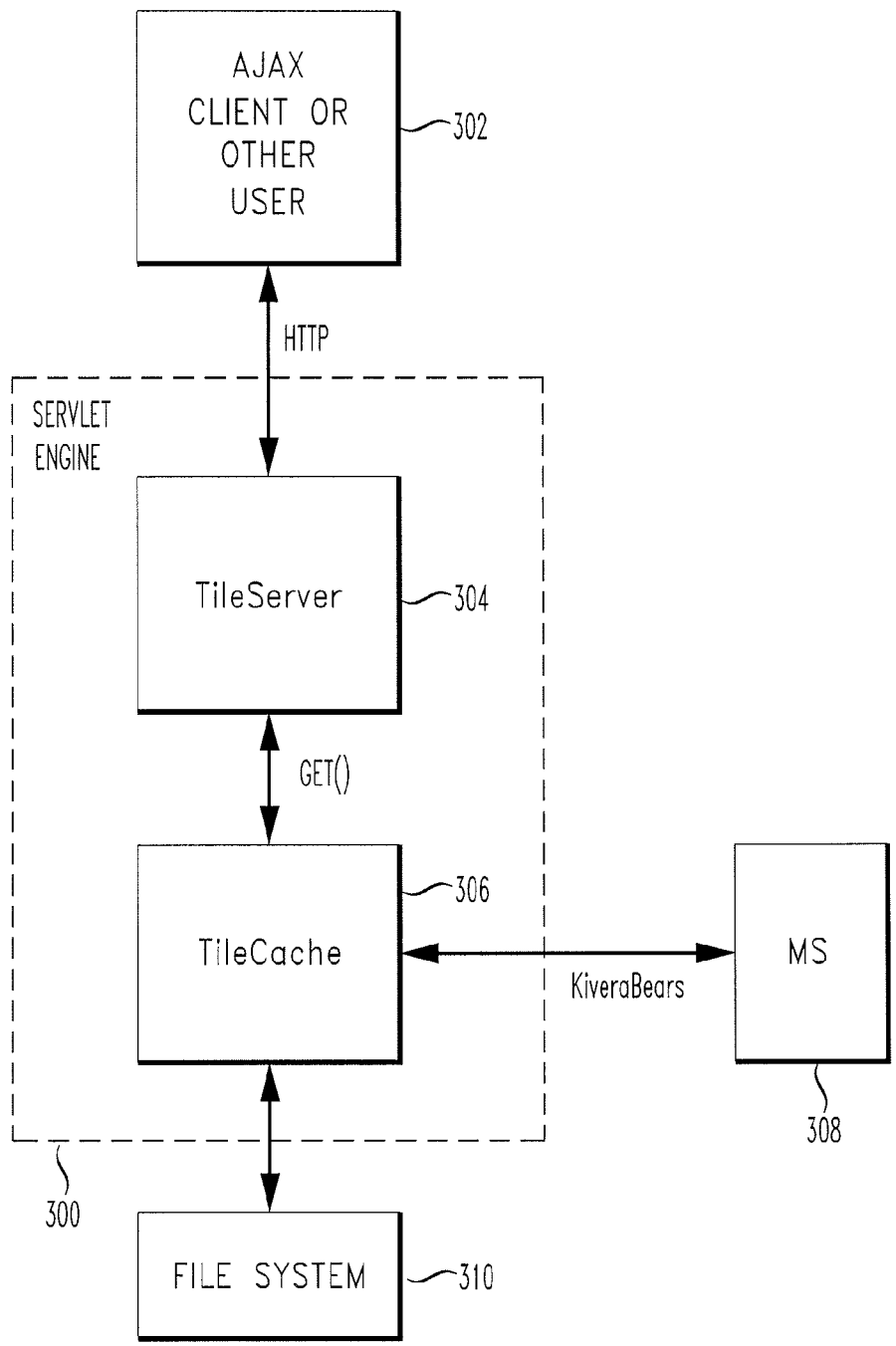
FIG. 1 shows an exemplary relationship of caching system components to each other, to the user, to the XMS and to the file system, in accordance with the principles of the present invention.

FIG. 1 shows an exemplary relationship of caching system components to each other, to a user, to a mapping server (MS) and to a file system, in accordance with the principles of the present invention.

The present inventor has realized that with respect to users each with 3×3 tile image map displays, one image for any given user device client (e.g., an Ajax client) requires at least 9 image requests. But in such a scenario, the image generating capacity of a conventional mapping server (MS) may be overtaxed, and potentially be outstripped.

As shown in FIG. 1, an image tile server (TS) 300 servlet engine comprises a TileServer object 304 and a TileCache object 306. An Ajax client or other user 302 accesses the image tile server 300 via HTTP, and the TileCache object 306 accesses an appropriate file system 310. A mapping server (MS) 308 is accessed by the TileCache object 306.

Thus, the invention provides an improved image tile server including a TileCache object 306, in accordance with the principles of the present invention.

The inventive image tile server (TS) 300 is implemented as a Java HttpServlet and is therefore accessed via Hypertext Transfer Protocol (HTTP). There is one parameter called 'key'.

The cached image tiles are put into the file system 310. The image tile server Servlet engines have a document root within which all file system interactions must take place. Under this document root the image tile server (TS) creates its own cache root directory in which all cached image tiles are stored. This cache root is configurable via the web.xml file, as shown in Table 2.

Figure 2:
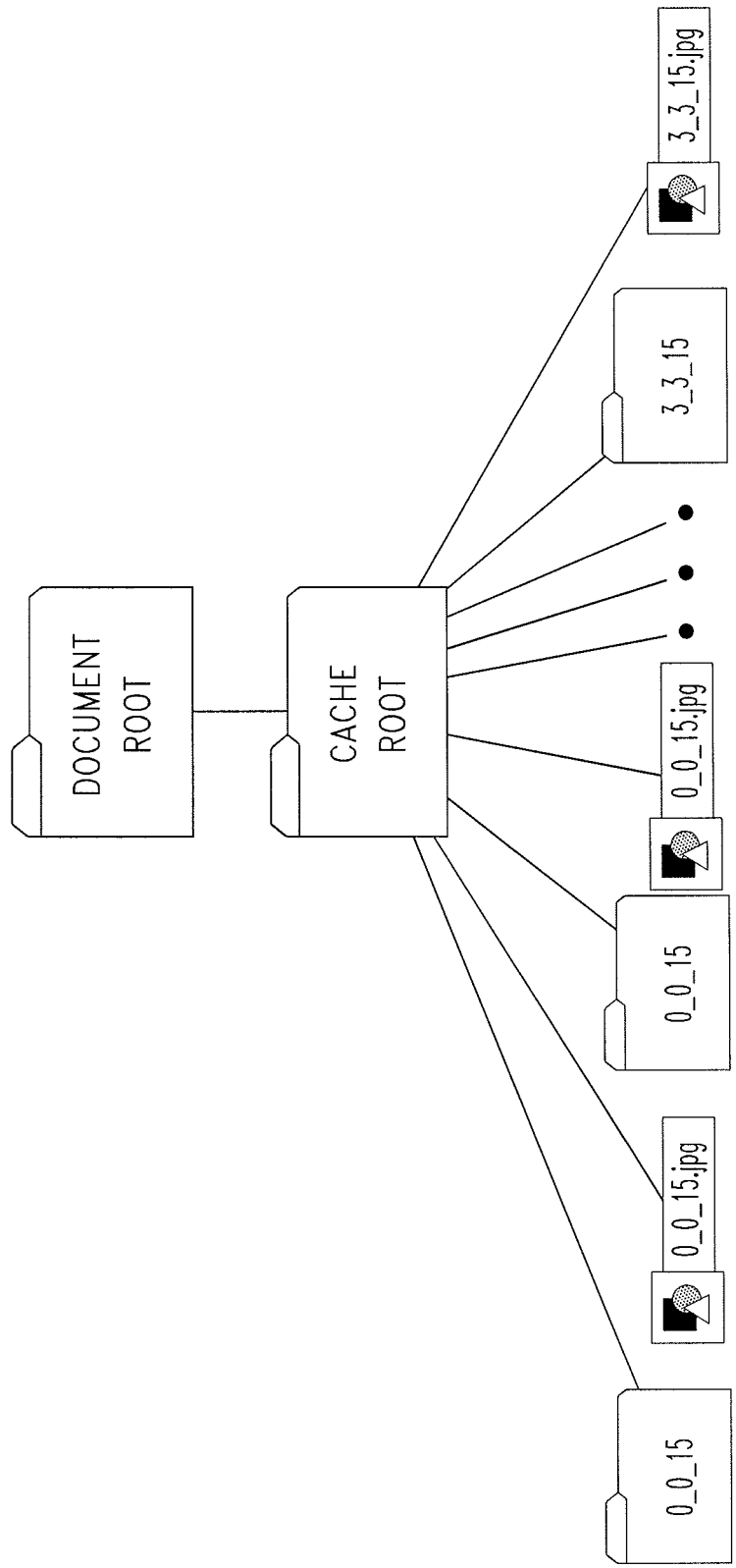
FIG. 2 shows the servlet engine's document root, the cache root, and the first level (15) of cached tiles, in accordance with the principles of the present invention.

FIG. 2 shows the servlet engine's document root, the cache root, and the first level (15) of cached tiles, in accordance with the principles of the present invention.

Figure 3:
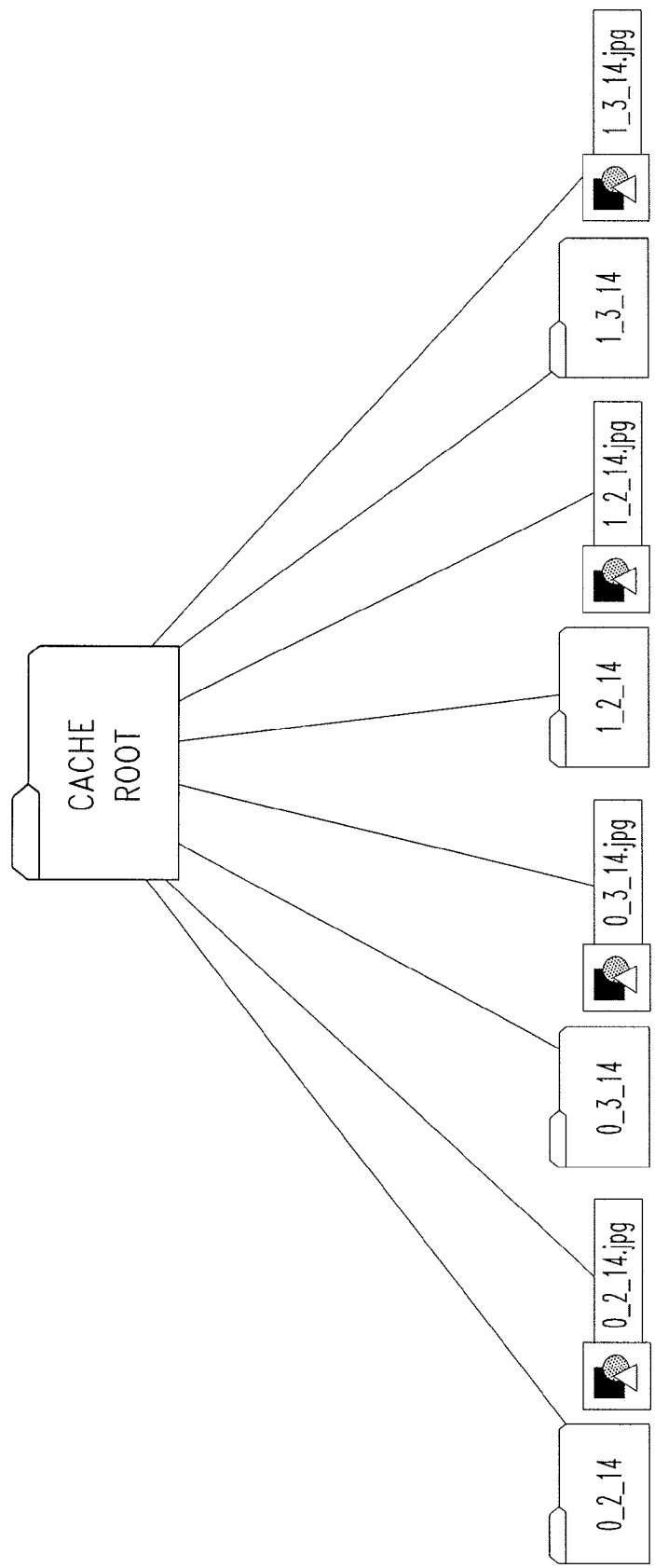
FIG. 3 shows an exemplary directory in the cache, in accordance with the principles of the present invention.

FIG. 3 shows an exemplary directory in the cache, in accordance with the principles of the present invention.

As shown in FIGS. 2 and 3 there are what can be considered parent image tiles and child image tiles, where each parent image tile at level 15 has 4 children found in level 14. The directory structure reflects this parent-child relationship. If the cache were allowed to grow indefinitely and become completely filled out with every image tile, then each and every directory (except roots and leaves) would contain exactly 4 image files and 4 directories.

FIG. 4 shows an exemplary universal resource locator (URL) to request an image tile from the inventive image tile server, in accordance with the principles of the present invention.

Preferably an image tile coordinate system is defined and implemented, allowing image tiles to be uniquely identified with an image tile "key". The image tile "key" value as referred to herein represents the 3-dimensional coordinate of a unique image tile among millions of available tiles in a given image database. In the disclosed embodiments, the key is made up of 3 non-negative integers separated by underscores, as shown in Table 1 below.

TABLE 1

The valid range of 'key'.
Key = X_Y_Z where X, Y and Z follow the rules below

| | |
|---|---|
| X | A member of $\{0, 1, \ldots, [2 \wedge (17 - Z)] - 1\}$ |
| Y | Same range as X. |
| Z | A member of $\{0, 1, 2, \ldots, 15\}$ |

The last number ("Z") is the zoom level. While the disclosed embodiments relate to a zoom level having 16 values, the principles of the present invention relate to implementation of an even greater number of zoom levels.

In the disclosed examples, the zoom level Z can range anywhere from 0 (full zoom in) to 15 (full zoom out). At zoom level 15 the whole earth is covered by a 4-by-4 square of 16 tiles.

The other two numbers that complete the key are the X and Y coordinates.

In the disclosed embodiments, the (0, 0, Z) tile is always in the upper-left corner of the image. As an example, in the case of zoom level 15, the (3, 3, 15) tile is the lower-right tile.

At zoom level 15 the legal values for X and Y are from 0 to 3. See Table 1 for more detail on the legal values or range of key.

FIG. 5 shows relevant portions of an exemplary configuration file, in accordance with the principles of the present invention.

In particular, as shown in FIG. 5, the disclosed embodiments of the inventive image tile server (TS) 300 are configured in the same way that Java Servlets are: via a web.xml file.

FIG. 5 shows a clip of all the image tile server specific portions from an example web.xml file, in accordance with the principles of the present invention.

Table 2 below describes exemplary configuration parameters, e.g., the init-params for the inventive image tile server 300, in accordance with the principles of the present invention.

TABLE 2

All the init-params for the Tile Server.

| Init-param name | Description |
|---|---|
| cacheRootDirectory | The directory under which all the image tiles are saved. This directory, if it does not exist, will be created in the servlet engine's document root. |
| cacheSize | A positive integer representing the amount of space the cached image tiles can use. When the limit is surpassed the replacement policy kicks in. |
| cacheSizeUnit | One of "KB", "MB", or "GB". The complement to cacheSize above. E.g. if cacheSize is 10 and cacheSizeUnit is MB, then the image tiles can take up 10 megabytes of space before the replacement policy begins replacing old image tiles with new ones. |
| host | The host name where the XMS is running. |
| port | The port on which the XMS is running. |
| maximumConnections | Number of connections to the XMS. |
| timeout | How often the connections are checked for requests. |

The TileServer object 304 is responsible for all initialization as well as receiving and forwarding requests to the TileCache object 306. The TileCache object 306 manages the cache—stores and retrieves tiles, implements the cache replacement policy, and keeps administrative information like the cache hit rate—interacts with the XMS via, e.g., a KiveraBeans API, and provides methods for validating keys and querying administrative information.

The principle entry point to the TileCache object 306 is the get( ) method. Preferably this get( ) method is synchronized to maintain data integrity. And, as get( ) is the only entry point for writing to the cache, it is the only method that needs to be synchronized.

While conventional replacement policies may be implemented, as the number of cache entries grows, memory required for cache management also grows. The disclosed embodiments of the image tile server (TS) were built with 200 GB of disk space in mind for the cache, which translates roughly to 15 million cache entries and 715 MB of memory, though certainly larger size caches may be implemented within the principles of the present invention.

The least recently used (LRU) technique is a high-performance, general-purpose replacement policy that is well suited for an application such as the image tile server (TS). The least recently used (LRU) technique works by throwing out the oldest (least recently used) item in a cache to make room when the cache is full. With underlying support from a Java infrastructure, the cache can be accessed in constant time, i.e., access times do not increase as the size of the cache increases.

An alternative to true LRU at the file level (i.e., removing the oldest single file to make room for a new entry) is to perform LRU at a coarser granularity, such as pruning entire sub-trees within the cache. This way only the roots of those sub-trees need to be managed, though using this alternative approach, the cache hit rate will likely suffer.

To capture an image of the entire earth on a flat surface, a single point (latitude and longitude) is chosen from which to make all the calculations for the projection onto a given image tile. By experimentation, 50° S on the latitudes and 0° on the longitudes was empirically found to produce pleasant proportions.

In the disclosed embodiments, the area of earth covered by an image tile is quartered at every zoom level. In other words, the length of the side of an image tile is halved.

For example, at zoom level 15, where the whole earth is displayed as a 4×4 grid of image tiles, the length of a side of an image tile spans 10,000 km at the equator (given that the equator is 40,000 km). So at zoom level 14 the length of one side of an image tile is 5,000 km, and so on. Once we reach zoom level 0, the length of a side of a tile image is about 0.305 km. The resulting zoom levels are nearly equivalent to what typical mapping websites provide. For instance, one conventional website has 18 zoom levels, but the 2 farthest out zoom levels are useless.

Figure 6:
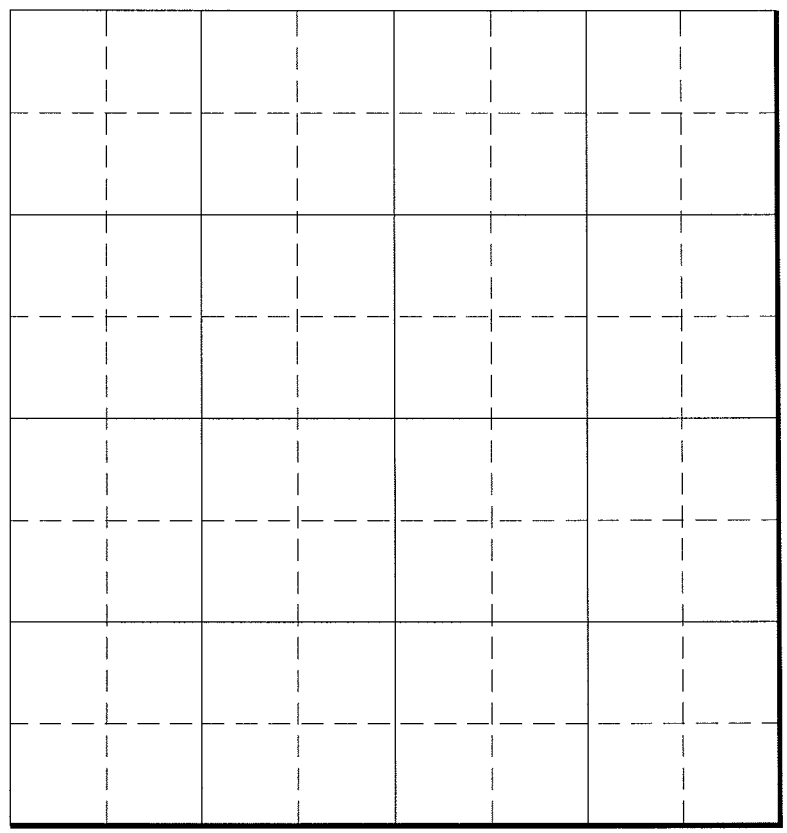
FIG. 6 shows the number and configuration of exemplary tiles at zoom level 15, in accordance with the principles of the present invention.

FIG. 6 shows the number and configuration of exemplary image tiles at zoom level 15, in accordance with the principles of the present invention.

Figure 7:
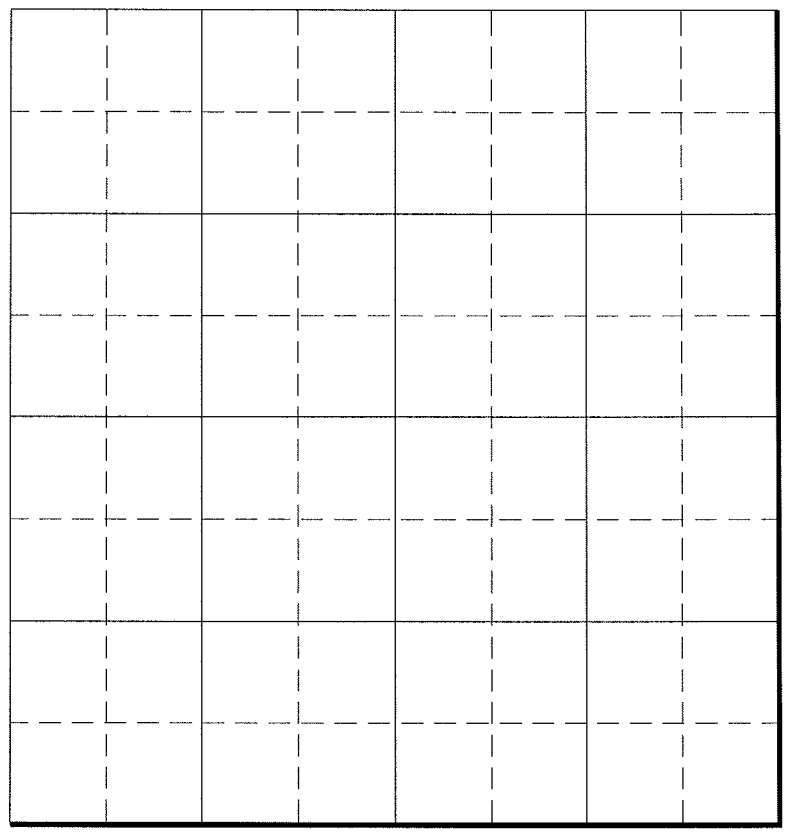
FIG. 7 shows zoom level 14, with each tile from zoom level 15 shown in FIG. 6 replaced with 4 sub tiles, in accordance with the principles of the present invention.

FIG. 7 shows zoom level 14, with each image tile from zoom level 15 shown in FIG. 6 replaced with 4 sub-tiles, in accordance with the principles of the present invention.

Figure 8:
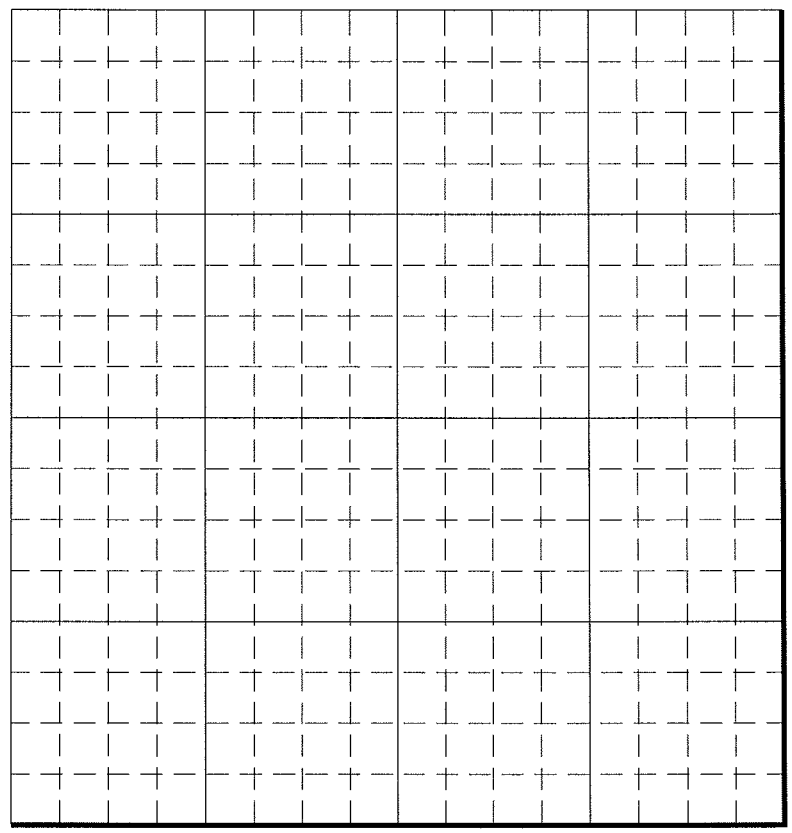
FIG. 8 shows zoom level 13, with each tile from zoom level 14 shown in FIG. 7 replaced with 4 sub tiles, in accordance with the principles of the present invention.

FIG. 8 shows zoom level 13, with each image tile from zoom level 14 shown in FIG. 7 replaced with 4 sub-tiles, in accordance with the principles of the present invention.

Synchronization of image tiles is inevitable and essentially required over time in an image tile server database. Synchronizing the only entry point to the image tile cache in the TileCache 306 is the easiest way to guarantee data integrity, however this tends to defeat the purpose of multithreading and become a performance bottleneck. A preferably alternative is to use more fine-grained use of synchronization, though a draw back to this approach is that synchronization bugs are more likely to creep into the code. Synchronization bugs are often non-deterministic and the most subtle type to catch.

While the invention has been described with reference to the exemplary embodiments thereof, those skilled in the art will be able to make various modifications to the described embodiments of the invention without departing from the true spirit and scope of the invention.

What is claimed is:

1. An intermediate map image tile server, comprising:
   a receiver to receive, at an intermediate image tile server, a first request for a map image tile file from a requesting user device;
   a transmitter to transmit a second request for said map image tile file to a mapping server; and
   a map image tile server cache, associated with said intermediate image tile server, to cache said requested map image tile file, said map image tile server cache pruning an entire sub-tree within said map image tile server cache for replacement with said requested map image tile file to maintain said map image tile server cache.

2. The intermediate map image tile server according to claim 1, further comprising:
   a map image file database within said mapping server.

3. The intermediate map image tile server according to claim 1, wherein:
   said requesting user device is a wireless user device.

4. The intermediate map image tile server according to claim 3, further comprising:
   said wireless user device is a wireless phone.

5. An intermediate map image tile server, comprising:
   a receiver to receive, at an intermediate image tile server, a first request for a map image tile file from a requesting user device;
   a transmitter to transmit a second request for said map image tile file to a mapping server; and
   a map image tile server cache, associated with said intermediate image tile server, to cache said requested map image tile file, said map image tile server cache pruning an entire sub-tree within said map image tile server cache for replacement with said requested map image tile file to maintain said map image tile server cache.

6. The intermediate map image tile server according to claim 5, further comprising:
   a map image file database within said mapping server.

7. The intermediate map image tile server according to claim 5, wherein:
   said requesting user device is a wireless user device.

8. The intermediate map image tile server according to claim 5, wherein:
   said wireless user device is a wireless phone.

9. A method of obtaining a tiled image from an intermediate map image tile server, comprising:
   receiving, at an intermediate image tile server, a first request for a map image tile file, said intermediate image tile server being remote from a requesting user device;
   transmitting a second request for said map image tile file to a mapping server;
   caching, at a map image tile server cache associated with said intermediate image tile server, said requested map image tile file; and
   pruning an entire sub-tree within said map image tile server cache for replacement with said requested map image tile to maintain said map image tile server cache.

10. A method of obtaining a tiled image from an intermediate map image tile server according to claim 9, wherein:
    said requesting user device is a wireless user device.

11. A method of obtaining a tiled image from an intermediate map image tile server according to claim 9, wherein:
said wireless user device is a wireless phone.

12. A method of retrieving an image tile from an intermediate map image tile server, comprising:
receiving, at an intermediate tile server remote from a requesting user device, a first request for a map image tile file;
transmitting a second request for said map image tile file to a mapping server;
caching, at a map image tile server cache associated with said intermediate tile server, said map image tile file;
pruning an entire sub-tree within said map image tile server cache for replacement with said requested map image tile file to maintain said map image tile server cache;
retrieving said map image tile file from said map image tile server cache when previously requested from said mapping server; and
providing said map image tile file from said map image tile server cache.

13. A method of retrieving an image tile from an intermediate map image tile server according to claim 12, wherein:
said requesting user device is a wireless user device.

14. A method of retrieving an image tile from an intermediate map image tile server according to claim 13, wherein:
said wireless user device is a wireless phone.

* * * * *